United States Patent
Geliot et al.

(10) Patent No.: US 11,345,479 B2
(45) Date of Patent: May 31, 2022

(54) AIRCRAFT ENGINE ATTACHMENT COMPRISING INCLINED FIXING ELEMENTS, AIRCRAFT COMPRISING SAID ENGINE ATTACHMENT AND METHOD FOR FIXING AN ENGINE TO AN AIRCRAFT PYLON USING SAID ENGINE ATTACHMENT

(71) Applicant: Airbus Operations SAS, Toulouse (FR)

(72) Inventors: Jean Geliot, Toulouse (FR); Thomas Deforet, Toulouse (FR); Adeline Soulie, Verdun sur Garonne (FR); Olivier Dubois, Castelginest (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 559 days.

(21) Appl. No.: 16/363,513

(22) Filed: Mar. 25, 2019

(65) Prior Publication Data
US 2019/0315477 A1   Oct. 17, 2019

(30) Foreign Application Priority Data
Apr. 11, 2018 (FR) ...................................... 1853162

(51) Int. Cl.
B64D 27/26 (2006.01)
(52) U.S. Cl.
CPC ........ B64D 27/26 (2013.01); *B64D 2027/266* (2013.01)
(58) Field of Classification Search
CPC ........................... B64D 27/26; B64D 2027/266
See application file for complete search history.

(56) References Cited

U.S. PATENT DOCUMENTS 6,296,203 B1 * 10/2001 Manteiga ............... B64D 27/18
244/54
2005/0269445 A1 * 12/2005 Chevalier ............... F16C 23/10
244/54

(Continued)

FOREIGN PATENT DOCUMENTS

| EP | 2522575 A2 | 11/2012 |
| EP | 3266713 A1 | 1/2018 |
| FR | 2916424 A1 | 11/2008 |

OTHER PUBLICATIONS

France Search Report; priority document.

*Primary Examiner* — Richard R. Green
*Assistant Examiner* — Arfan Y. Sinaki
(74) *Attorney, Agent, or Firm* — Greer, Burns & Crain, Ltd.

(57) ABSTRACT

An engine attachment configured to link an engine and an aircraft pylon comprising a first end fitting having two mutually parallel wings, a joining piece positioned between the first end fitting wings and linked to the first end fitting by a link system, fixing elements, linking the first end fitting and the pylon, including first and second fixing elements positioned between the first end fitting wings which are inclined by an angle of between 10 and 45° to be able to be put in place and removed in the presence of the joining piece linked to the first end fitting by the link system. The inclined fixing elements absorb lateral loads. The joining piece and the first end fitting are linked by the link system before the engine is fixed to the pylon. The engine is fixed to the pylon by putting the fixing elements in place.

4 Claims, 2 Drawing Sheets

(56) References Cited

U.S. PATENT DOCUMENTS

| | | | |
|---|---|---|---|
| 2006/0012091 A1* | 1/2006 | Rose | B64D 27/26 267/141 |
| 2009/0266933 A1* | 10/2009 | Foster | F01D 25/28 244/54 |
| 2009/0308078 A1* | 12/2009 | Foster | B64D 27/26 60/796 |
| 2009/0308972 A1* | 12/2009 | Foster | B64D 27/26 244/54 |
| 2010/0127117 A1* | 5/2010 | Combes | B64D 27/26 244/54 |
| 2010/0133376 A1* | 6/2010 | Foyer | B64D 27/26 244/54 |
| 2012/0119056 A1* | 5/2012 | Dunleavy | C22C 47/062 248/554 |
| 2012/0234970 A1* | 9/2012 | Marche | B64D 27/26 244/54 |
| 2012/0286125 A1 | 11/2012 | Marche | |
| 2014/0061375 A1* | 3/2014 | Sandy | F02K 3/06 244/54 |
| 2014/0183298 A1* | 7/2014 | Brochard | B64D 27/26 244/54 |
| 2018/0009543 A1 | 1/2018 | Journade et al. | |
| 2018/0237147 A1* | 8/2018 | Suciu | B64D 35/04 |

\* cited by examiner

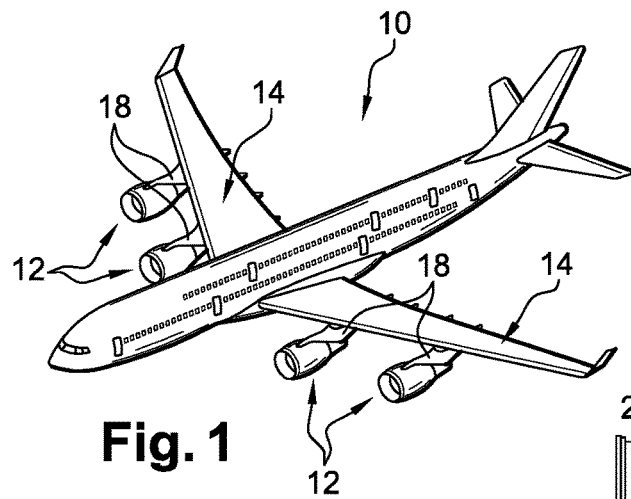
Fig. 1
Prior Art
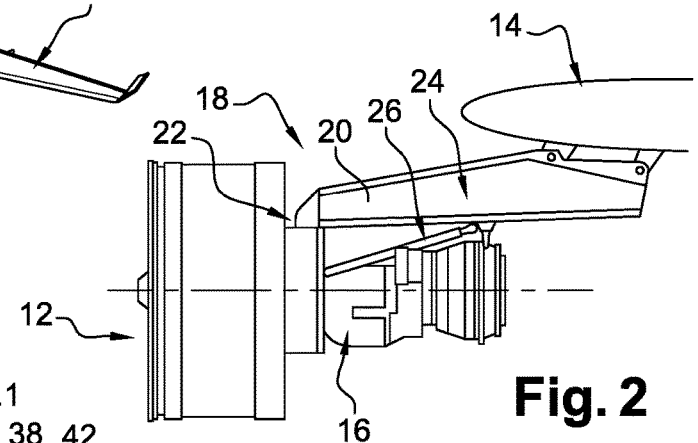
Fig. 2
Prior Art
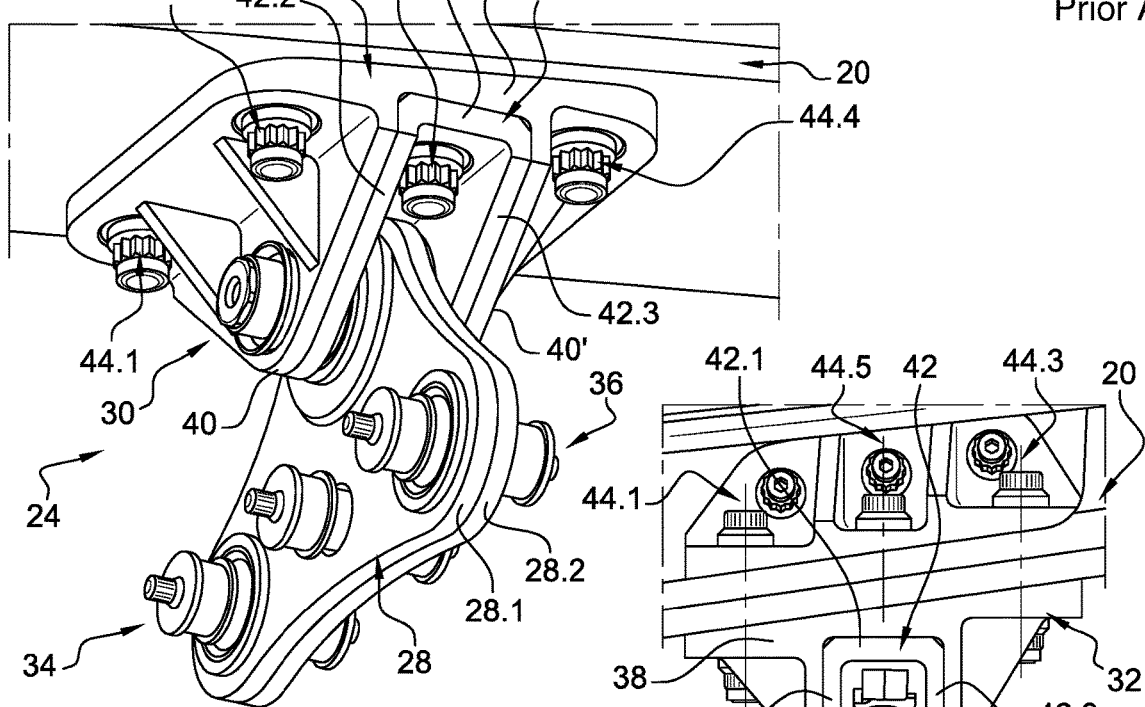
Fig. 3
Prior Art
Fig. 4
Prior Art

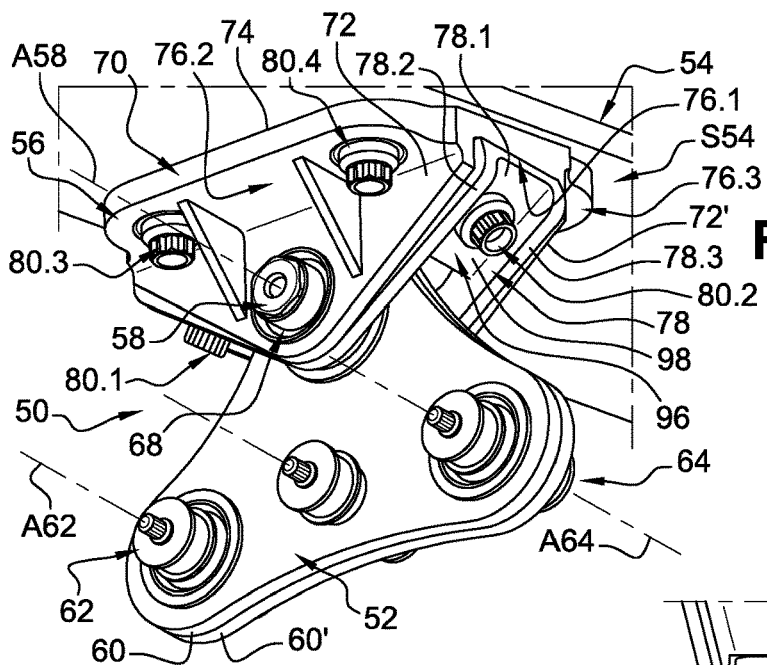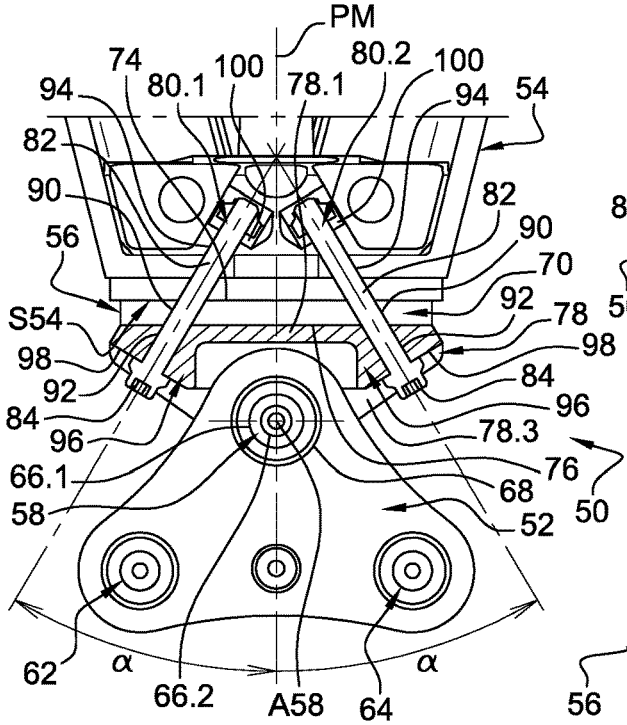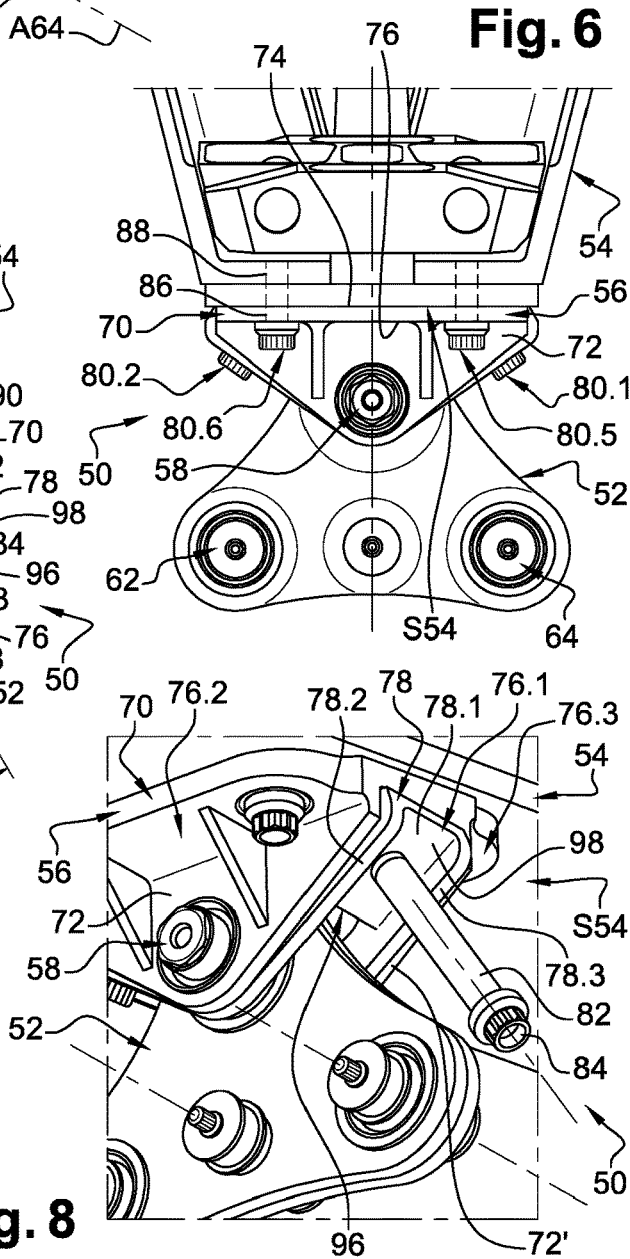

AIRCRAFT ENGINE ATTACHMENT COMPRISING INCLINED FIXING ELEMENTS, AIRCRAFT COMPRISING SAID ENGINE ATTACHMENT AND METHOD FOR FIXING AN ENGINE TO AN AIRCRAFT PYLON USING SAID ENGINE ATTACHMENT

CROSS-REFERENCES TO RELATED APPLICATIONS

This application claims the benefit of the French patent application No. 1853162 filed on Apr. 11, 2018, the entire disclosures of which are incorporated herein by way of reference.

FIELD OF THE INVENTION

The present application relates to an aircraft engine attachment comprising inclined fixing elements, an aircraft comprising the engine attachment and a method for fixing an engine to an aircraft pylon using the engine attachment.

BACKGROUND OF THE INVENTION

According to a configuration that can be seen in FIGS. 1 and 2, an aircraft 10 comprises several engine assemblies 12 which are positioned under the airfoil 14 of the aircraft 10.

An engine assembly 12 comprises an engine 16, a nacelle (not represented in FIG. 2) positioned around the engine 16 and a pylon 18 which ensures the link between the engine 16 and the rest of the aircraft 10, in particular, the airfoil 14.

The pylon 18 comprises a primary structure 20 which is linked to the engine 16 by a front engine attachment 22, a rear engine attachment 24 and a pair of torque arms 26 which ensure the absorption of the thrust loads.

According to an embodiment that can be seen in FIGS. 3 and 4, the rear engine attachment 24 comprises an approximately triangular joining piece 28, which has two plates 28.1, 28.2 pressed against one another. One of the vertices of the joining piece 28 oriented towards the pylon 18 is linked by a first link system 30 to a first end fitting 32 secured to the pylon 18. One of the sides of the joining piece 28, oriented towards the engine 16, is linked by second and third link systems 34, 36 to second and third end fittings (not represented) secured to the engine 16.

The first, second and third link systems 30, 34, 36 have axes that are approximately parallel to one another and approximately at right angles to the joining piece 28.

According to one design, each link system 30, 34, 36 is an assembly of two pieces, fitted into one another, and of blocking elements, such as, for example, nuts and lock washers, to keep the two pieces fitted into one another.

The first end fitting 32 has a plate 38 pressed against the pylon 18 and two mutually parallel wings 40, 40' linked to the plate 38. In operation, the first link system 30 passes through the two wings 40, 40' and the joining piece 28 positioned between the two wings 40, 40'.

The rear engine attachment 24 comprises, in addition to the first end fitting 32, a reinforcement 42 with a U-shaped section, positioned between the wings 40, 40' of the first end fitting 32, which has a base 42.1 pressed against the plate 38 and two wings 42.2, 42.3 pressed against the wings 40, 40' of the first end fitting 32 and passed through by the first link system 30.

The first end fitting 32 is fixed to the pylon 18 using six fixing elements 44.1 to 44.6, arranged symmetrically relative to a median plane at right angles to the wings 40, 40'. In addition to these fixing elements 44.1 to 44.6 configured to ensure the absorption of the vertical loads, shear pins are provided straddling the first end fitting 32 and the pylon 18 to ensure the absorption of the lateral loads.

Two pairs of link elements 44.1 to 44.4 are arranged on either side of the wings 40, 40' of the first end fitting 32 and a pair of link elements 44.5, 44.6 is arranged between the wings 40, 40' of the first end fitting 32 and the wings 42.2, 42.3 of the reinforcement 42.

These fixing elements 44.1 to 44.6 can be dismantled and each comprise at least one cylindrical rod.

According to one arrangement, all the cylindrical rods of the six fixing elements 44.1 to 44.6 are parallel and oriented in an approximately vertical direction (when the aircraft is on the ground). Thus, the six fixing elements 44.1 to 44.6 comprise heads bearing against bearing faces of the plate 38 that are coplanar or parallel to one another.

The fixing elements 44.5 and 44.6, arranged between the wings 40, 40' of the first end fitting 32, can be put in place or removed only if the joining piece 28 is not yet linked to the first end fitting 32 by the first link system 30.

Consequently, the engine 16 is fixed to the pylon 18 by putting in place the first link system 30. Now, it is difficult to assemble the first link system 30, because of its complexity, at the time of fixing of the engine 16 to the pylon 18.

When the engine 16 is removed and detached from the pylon 18, it is necessary to disassemble the first link system 30, which is relatively complex.

The present invention aims to remedy the drawbacks of the prior art.

SUMMARY OF THE INVENTION

To this end, a subject of the invention is an engine attachment configured to link an engine and an aircraft pylon, the engine attachment comprising:

a first end fitting having a plate, configured to be pressed against a contact surface of the pylon, and two mutually parallel wings linked to the plate, a joining piece, configured to be linked to the engine, positioned between the wings of the first end fitting and linked to the first end fitting by a first link system, fixing elements, configured to link the first end fitting and the pylon, including first and second fixing elements positioned between the wings of the first end fitting, for each of the fixing elements, through holes provided in the plate of the first end fitting.

According to the invention, for each of the first and second fixing elements, the through holes of the plate of the first end fitting have axes of revolution forming an angle of between 10 and 45° with a vertical median plane in order for the first and second fixing elements to be able to be put in place and removed in the presence of the joining piece linked to the first end fitting by the first link system.

According to the invention, the engine is fixed to the pylon by putting in place the fixing elements ensuring the link between the first end fitting and the pylon. Thus, the first link system, linking the joining piece and the first plate, can be put in place before the engine is fixed to the pylon. Contrary to the prior art, the fixing of the engine to the pylon or its removal are performed by screwing or unscrewing the fixing elements linking the first end fitting to the pylon, and not the first link system linking the first end fitting to the joining piece. In addition, since the first and second fixing elements are inclined, they ensure the absorption of the lateral loads which makes it possible to eliminate the shear pins.

According to one configuration, the engine attachment comprises a U-shaped reinforcement which has a base, pressed against the plate of the first end fitting, and two wings, pressed against the wings of the first end fitting, the reinforcement comprising, for each of the first and second fixing elements, a through hole having an axis of revolution aligned with that of the corresponding through hole of the plate of the first end fitting.

According to a first embodiment, the reinforcement comprises, for each of the first and second fixing elements, a boss having a bearing surface which surrounds the through hole of the reinforcement and which is at right angles to the axis of revolution of the through hole of the reinforcement.

According to a second embodiment, the reinforcement comprises a single boss having, for each of the first and second fixing elements, a bearing surface which surrounds the through hole of the reinforcement and which is at right angles to the axis of revolution of the through hole of the reinforcement.

According to a third embodiment, the rear engine attachment comprises, for each of the first and second fixing elements, a washer, inserted between a head of the fixing element and the reinforcement or the plate of the first end fitting, the washer comprising two faces which form an angle approximately equal to the angle $\alpha$ provided between the axes of revolution of the through holes and the vertical median plane.

According to another feature, the angle between the axes of revolution of the through holes and the vertical median plane is determined to allow the first and second fixing elements to be put in place or removed in the presence of the joining piece positioned between the wings of the first end fitting, the angle being the smallest possible angle.

Another subject of the invention is an aircraft comprising an engine attachment according to one of the preceding features linking an engine and an aircraft pylon.

According to a first variant, the pylon of the aircraft comprises, for each of the first and second fixing elements, a bearing surface which surrounds the corresponding through hole of the pylon and which is at right angles to the through hole.

According to a second variant, the rear engine attachment comprises, for each of the first and second fixing elements, a washer inserted between a nut of the fixing element and the pylon, the washer comprising two faces which form an angle approximately equal to the angle $\alpha$ provided between the axes of revolution of the through holes and the vertical median plane.

Also, a subject of the invention is a method for fixing an engine to an aircraft pylon, the aircraft comprising an engine attachment according to one of the preceding features. The method is characterized in that, prior to the fixing of the engine to the pylon, the joining piece is linked to the engine and the first end fitting is linked to the joining piece using the first link system, and in that the engine is fixed to the pylon by putting in place the fixing elements.

BRIEF DESCRIPTION OF THE DRAWINGS

Other features and advantages will emerge from the following description of the invention, a description given purely by way of example, in light of the attached drawings in which:

FIG. 1 is a perspective view of an aircraft,
FIG. 2 is a side view of an engine assembly without cowl which illustrates a link between an engine and an aircraft pylon,
FIG. 3 is a perspective view of a part of a rear engine attachment which illustrates an embodiment according to the prior art,
FIG. 4 is a cross section of the part of the rear engine attachment that can be seen in FIG. 3,
FIG. 5 is a perspective view of a part of a rear engine attachment which illustrates an embodiment of the invention,
FIG. 6 is a front view of the part of the rear engine attachment that can be seen in FIG. 5,
FIG. 7 is a transverse cross section of the part of the rear engine attachment that can be seen in FIG. 5, and
FIG. 8 is a perspective view of the part of the rear engine attachment that can be seen in FIG. 5 which illustrates a fixing element in the dismantled state.

DETAILED DESCRIPTION OF THE PREFERRED EMBODIMENTS

As illustrated in FIGS. 5 to 8, a rear engine attachment 50 comprises a joining piece 52, inserted between an engine and an aircraft pylon 54, a first end fitting 56 fixed to the pylon 54 and a link system 58 linking the joining piece 52 and the first end fitting 56.

This joining piece 52 comprises a plate 60 or several plates 60, 60' pressed against one another.

According to one configuration, the joining piece 52 is approximately triangular. One of the vertices of the joining piece 52, oriented towards the pylon 54, is linked by the first link system 58 to the first end fitting 56 secured to the pylon 54. One of the sides of the joining piece 52, oriented towards the engine, is linked by second and third link systems 62, 64 to second and third end fittings (not represented) secured to the engine.

The first, second and third link systems 58, 62, 64 have axes of revolution A58, A62, A64 approximately parallel to one another and approximately at right angles to the plate 60 of the joining piece 52.

Hereafter in the description, a longitudinal direction is parallel to the axis A58 of the first link system 58. A transverse plane is at right angles to the axis A58 of the first link system 58.

According to a design that can be seen in FIG. 7, each link system 58, 62, 64 is an assembly of two pieces 66.1, 66.2 fitted into one another and of blocking elements 68, such as, for example, nuts and lock washers, to keep the two pieces 66.1, 66.2 fitted into one another.

The first end fitting 56 has a plate 70, pressed against a contact surface S54 of the pylon 54, and two mutually parallel wings 72, 72' linked to the plate 70. When the joining piece 52 is linked to the first end fitting 56, the first link system 58 passes through the two wings 72, 72' and the joining piece 52 is positioned between the two wings 72, 72'. The plate 70 comprises a first contact face 74, at right angles to the median plane PM, configured to be pressed against the pylon 54, and a second bearing face 76, opposite the first contact face 74, on which the wings 72, 72' are located. This second face 76 is divided into three zones 76.1 to 76.3, a first zone 76.1 arranged between the wings 72, 72' and second and third zones 76.2, 76.3 arranged on either side of the wings 72, 72'. These three zones 76.1 to 76.3 are substantially flat and coplanar.

According to one configuration, the rear engine attachment 50 comprises, in addition to the first end fitting 56, a reinforcement 78, positioned between the wings 72, 72' of the first end fitting 56, which has a base 78.1 pressed against the first zone 76.1 of the plate 70 and two mutually parallel wings 78.2, 78.3 pressed against the wings 72, 72' of the first end fitting 56 and passed through by the first link system 58.

The rear engine attachment 50 also comprises fixing elements 80.1 to 80.6 to link the first end fitting 56 and the pylon 54, in particular, six fixing elements 80.1 to 80.6, arranged symmetrically relative to a median plane PM, at right angles to the wings 72, 72' and containing the axis A58 of the first link system 58. When the aircraft is on the ground, the median plane is approximately vertical.

Each fixing element 80.1 to 80.6 takes the form of a screw and comprises a cylindrical rod 82 and a head 84 positioned at an end of the cylindrical rod 82.

The first and second fixing elements 80.1, 80.2 are arranged in the first zone 76.1 and pass through the plate 70 and the reinforcement 78. The third and fourth fixing elements 80.3, 80.4 are arranged in the second zone 76.2 and pass through the plate 70. The fifth and sixth fixing elements 80.5, 80.6 are arranged in the third zone 76.3 and pass through the plate 70.

For each of the third, fourth, fifth and sixth fixing elements 80.3 to 80.6, the plate 70 comprises a through hole 86 which has an axis of revolution at right angles to the second bearing face 76 of the plate 70 and the pylon 54 comprises a through hole 88 which has an axis of revolution at right angles to the contact surface S54. The through holes 86 of the plate configured to house the third, fourth, fifth and sixth fixing elements 80.3 to 80.6 are parallel to one another and parallel to the median plane PM.

Apart from the reinforcement 78 and the locations of the first and second fixing elements 80.1, 80.2, the other pieces of the engine attachment can be identical to those of an engine attachment of the prior art.

For each of the first and second fixing elements 80.1, 80.2, the plate 70 and the reinforcement 78 respectively comprise through holes 90, 92, which have axes of revolution that are aligned, and the pylon 54 comprises a through hole 94 which emerges on the contact surface S54 of the pylon 54 and which is aligned with the through holes 90, 92 when the first end fitting 56 is fixed to the pylon 54.

The through holes 90, 92, 94, configured to house the first and second fixing elements 80.1, 80.2, have axes of revolution positioned in the same transverse plane, as illustrated in FIG. 7. The through holes 90, 92, 94 intended for the first fixing element 80.1 are symmetrical, relative to the vertical median plane PM, to the through holes 90, 92, 94 intended for the second fixing element 80.2.

According to a feature of the invention, the first and second fixing elements 80.1, 80.2 each form an angle $\alpha$ between 10 and 45° with the vertical median plane PM. To this end, the through holes 90, 92, 94 each have an axis of revolution forming an angle equal to the angle $\alpha$ with the vertical median plane PM. The angle $\alpha$ is determined to allow the first and second fixing elements 80.1, 80.2 to be put in place or removed in the presence of the joining piece 52 positioned between the wings 72, 72' of the first end fitting 56 and linked to the latter by the first link system 58. The angle $\alpha$ must, however, be the smallest possible angle to absorb a maximum of loads in a vertical direction.

The inclination of the first and second fixing elements 80.1, 80.2 makes it possible to absorb lateral loads, which makes it possible to eliminate the shear pins straddling the first end fitting 56 and the pylon 54 according to the prior art.

According to a first embodiment, the reinforcement 78 comprises, for each of the first and second fixing elements 80.1, 80.2, a boss 96 having a bearing surface 98 which surrounds the through hole 92 and which is at right angles to the axis of revolution of the through hole 92. This bearing surface 98 offers a contact surface for the head 84 of the fixing elements 80.1 and 80.2.

According to a second embodiment, the reinforcement 78 comprises a single boss 96 having, for each of the first and second fixing elements 80.1, 80.2, a bearing surface 98 which surrounds the through hole 92 and which is at right angles to the axis of revolution of the through hole 92.

According to a third embodiment, the rear engine attachment 50 comprises, for each of the first and second fixing elements 80.1, 80.2, a washer inserted between the head 84 of the fixing element 80.1 or 80.2 and the reinforcement 78, the washer comprising two faces which form an angle approximately equal to the angle $\alpha$ provided between the axes of revolution of the through holes and the vertical median plane PM.

According to one configuration, the through holes 94 provided on the pylon are smooth and the fixing elements each comprise a nut.

According to this configuration, the pylon comprises, for each of the first and second fixing elements 80.1, 80.2, a bearing surface 100 which surrounds each through hole 94 and which is at right angles to the through hole 94 or the rear engine attachment 50 comprises, for each of the first and second fixing elements 80.1, 80.2, a washer inserted between the nut of the fixing element 80.1 or 80.2 and the pylon 54, the washer comprising two faces which form an angle approximately equal to the angle $\alpha$.

The invention makes it possible to be able to put in place or remove the first and second fixing elements 80.1, 80.2, positioned between the wings 72, 72' of the first end fitting 56, even in the presence of the joining piece 52 linked to the first end fitting 56 by the first link system 58.

Thus, this first link system 58 can be put in place to link the joining piece 52 and the first end fitting 56 before fixing the engine to the pylon 54. According to the invention, the engine is fixed to the pylon by putting in place the fixing elements 80.1 to 80.6 ensuring the link between the first end fitting 56 and the pylon 54.

In addition, since the first and second fixing elements 80.1, 80.2 are inclined, they ensure the absorption of the lateral loads, which makes it possible to eliminate the shear pins.

Although described applied to a rear engine attachment, the invention can be applied to any engine attachment linking the engine and the pylon of the aircraft. Furthermore, for some applications, the reinforcement 78 can be eliminated. In this case, the plate 70 of the first end fitting (56) comprises the boss or bosses 96.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising an aircraft pylon attached to an engine by means of an engine attachment, the aircraft pylon comprising a vertical median plane separating the aircraft pylon into two symmetrical parts from each other, the engine attachment configured to link the engine and the aircraft pylon, the engine attachment comprising:
- a first end fitting having a plate, configured to be pressed against a contact surface of the pylon, and two mutually parallel wings linked to the plate,
- a joining piece, configured to be linked to the engine, positioned between the wings of the first end fitting and linked to the first end fitting by a first link system,
- fixing elements, configured to link the first end fitting and the pylon, including first and second fixing elements positioned between the wings of the first end fitting,
- for each of the fixing elements, through holes provided in the plate of the first end fitting,
- wherein, for each of the first and second fixing elements, the through holes of the plate of the first end fitting have axes of revolution forming an angle of between 10 and 45° with the vertical median plane, in order for the first and second fixing elements to be able to be put in place and removed in a presence of the joining piece linked to the first end fitting by the first link system.

2. The engine attachment according to claim 1, the engine attachment comprising a U-shaped reinforcement which has a base, pressed against the plate of the first end fitting, and two wings pressed against the wings of the first end fitting, characterized in that the reinforcement comprises, for each of the first and second fixing elements, a through hole having an axis of revolution aligned with that of a corresponding through hole of the plate of the first end fitting.

3. The engine attachment according to claim 2, wherein the reinforcement comprises, for each of the first and second fixing elements, a boss having a bearing surface which surrounds the through hole of the reinforcement and which is at right angles to the axis of revolution of the through hole of the reinforcement.

4. The engine attachment according to claim 2, wherein the reinforcement comprises a single boss having, for each of the first and second fixing elements, a bearing surface which surrounds the through hole of the reinforcement and which is at right angles to the axis of revolution of the through hole of the reinforcement.

* * * * *